United States Patent [19]

Mizusawa

[11] Patent Number: 4,684,463
[45] Date of Patent: Aug. 4, 1987

[54] FILTER DEVICE FOR IN-TANK TYPE FUEL PUMP FOR VEHICLE

[75] Inventor: Akira Mizusawa, Utsunomiya, Japan

[73] Assignee: Nifco, Inc., Yokohama, Japan

[21] Appl. No.: 833,363

[22] Filed: Feb. 25, 1986

[30] Foreign Application Priority Data

Feb. 27, 1985 [JP] Japan .............................. 60-26327[U]

[51] Int. Cl.³ .............................................. B01D 35/02
[52] U.S. Cl. .................................... 210/172; 210/258; 210/416.4; 210/485
[58] Field of Search ...................... 210/416.4, 167, 475, 210/168, 477, 172, 479, 251, 481, 258, 482, 398, 485, 454, 459, 460, 462, 463, 473, 474

[56] References Cited

U.S. PATENT DOCUMENTS 3,875,059  4/1975  Machino ........................ 210/416.4
4,420,396 12/1983 Yamamoto et al. ............. 210/416.4

Primary Examiner—Frank Sever
Attorney, Agent, or Firm—Trexler, Bushnell, Giangiorgi & Blackstone, Ltd.

[57] ABSTRACT

A filter device for an in-tank type fuel pump for a vehicle, which comprises a pump holder coupled to a lower end portion of an in-tank type fuel pump having an inlet, and a filter housing coupled to the lower end of the pump holder and having at least one filter window which is closed by a filter element for filtering fuel taken in by the pump, and a suction pipe provided between the bottom of the pump holder and filter housing, extending into the filter housing and having a lower open end in the neighborhood of the suction pipe being substantially parallel to the bottom of the fuel tank.

3 Claims, 4 Drawing Figures

U.S. Patent  Aug. 4, 1987  4,684,463
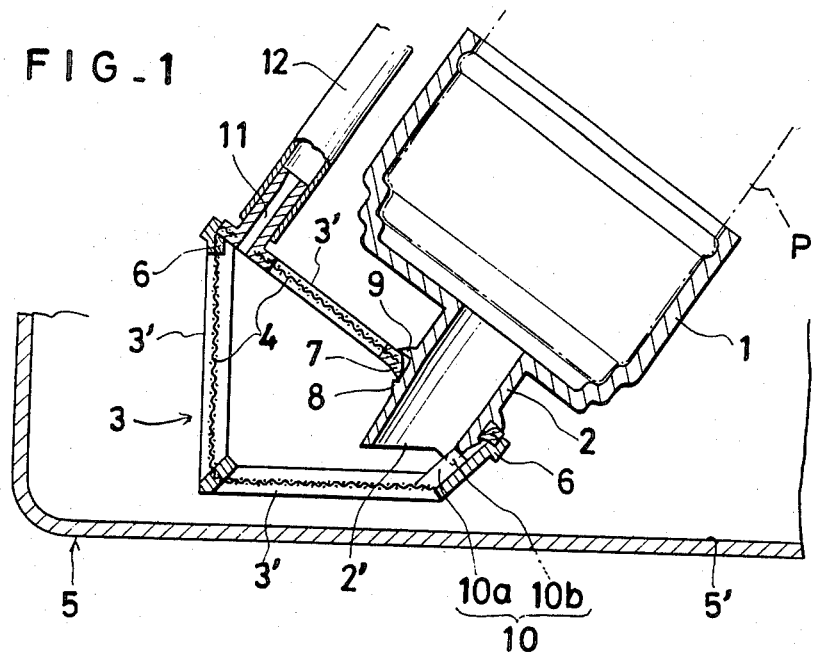
FIG_1
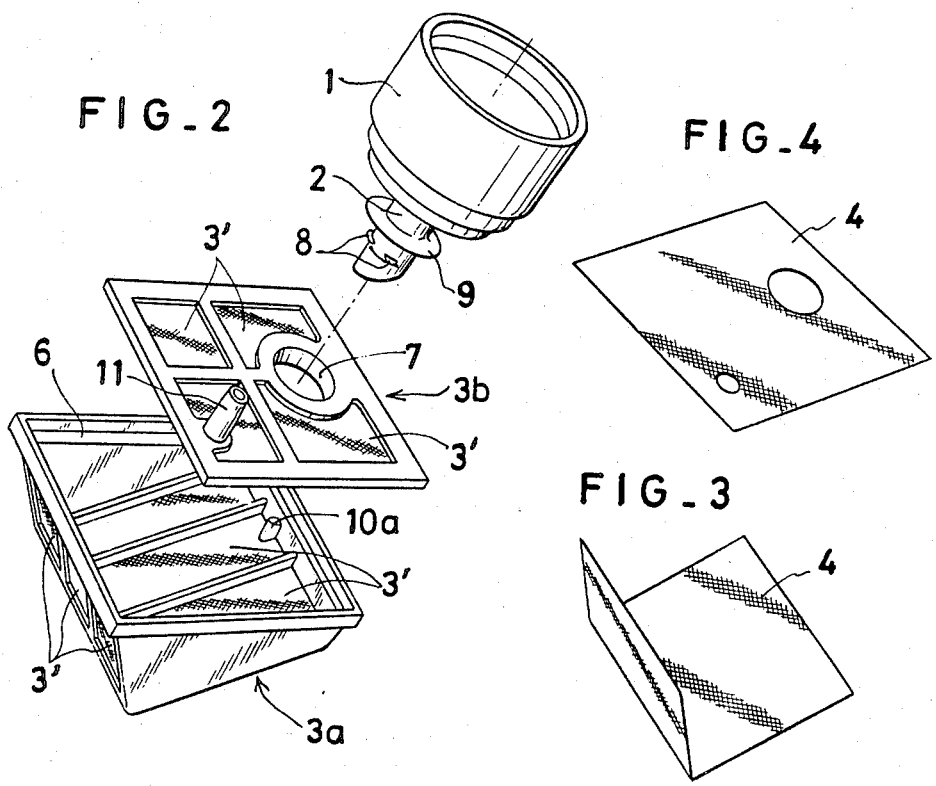
FIG_2
FIG_4
FIG_3

FILTER DEVICE FOR IN-TANK TYPE FUEL PUMP FOR VEHICLE

FIELD OF THE INVENTION AND RELATED ART STATEMENT

This invention relates to a filter device which is mounted on a lower end portion of an in-tank type fuel pump installed in a vehicle fuel tank for filtering fuel withdrawn through an inlet provided at a lower end portion.

Such a filter device for an in-tank type fuel pump is well known and disclosed in Japanese Laid-Open Patent Publication No. 57-184408. The disclosed filter device has a filter housing consisting of a substantially cylindrical member having a top wall and a bottom wall, and a pump holder, in which the lower end of a suction pump is mounted, is provided on the top wall of the filter housing.

A lower end portion of the pump extends into the filter housing through a pump holder provided on the top wall. The filter housing has to have a greater diameter than the outer diameter of the pump. Thus, its size is inevitably large, leading to high cost. In addition, where the pump is disposed in an inclined state with respect to the bottom of a tank, the inlet of the pump is inclined with respect to the bottom of the tank. In this case, when there is little fuel in the tank, the pump is liable to intake air from the tank.

OBJECT AND SUMMARY OF THE INVENTION

An object of the invention is to provide a filter device for an in-tank type fuel pump, which can be conveniently mounted on a lower end portion of the in-tank type fuel pump having an inlet, is small in size and light in weight, and has a filtering area sufficient for effectively pumping fuel out of the fuel tank.

To attain the above object of the invention, there is provided an in-tank type fuel pump comprising a pump holder coupled to a lower end portion of an in-tank type fuel pump having an inlet; a filter housing coupled to the lower end of said pump holder and having at least one filter window which is closed by a filter element for filtering fuel taken in by the pump; and a suction pump provided between the bottom of said pump holder and said filter housing, extending into said filter housing and having a lower open end in the neighborhood of the bottom of said filter housing, the lower open end of said suction pipe being substantially parallel to the bottom of a fuel tank.

The pump holder is fitted on a lower end portion of the in-tank type fuel pump having an inlet. The pump intakes fuel through the filter housing and a suction pipe which is provided between the bottom of the pump holder and the filter housing and has a lower open end extending substantially parallel to the bottom of the tank and forces out the withdrawn fuel to the outside of the tank.

The above and other objects and features of the invention will become more apparent from the following detailed description with reference to the accompanying drawings.

BRIEF DESCRIPTION OF THE DRAWINGS

FIG. 1 is a sectional view showing an embodiment of the filter device according to the invention;

FIG. 2 is an exploded perspective view showing the same embodiment; and

FIGS. 3 and 4 are perspective views showing filter elements provided in inserted moldings in a filter housing.

DETAILED DESCRIPTION OF THE PREFERRED EMBODIMENT

The drawings show one embodiment of the invention. Reference numeral 1 designates a cylindrical pump holder, numeral 2 a suction pipe, numeral 2' a lower open end of the suction pipe, numeral 3 a filter housing, and numeral 3' a filter window which is closed by a filter element 4. In this embodiment, the suction pipe 2 extends downwards from the bottom of the cylindrical pump holder 1. It is molded integrally with the pump holder from a plastic material. The filter housing 3 has a lower wall, which extends substantially parallel to the bottom wall 5' of a tank 5, an upright wall extending from one edge of the lower wall, a substantially triangular frame 3a having two end plates closing the end of the bottom wall and the end of the upright wall, and a lid plate 3b covering an inclined open top of the frame 3a. As shown in FIG. 2, the frame 3a has its bottom wall and upright wall formed with respective filter windows 3', and has a filter element 4, which is substantially L-shaped in sectional profile and is mounted by insert molding. The lid plate 3b is a plastic molding having filter windows 3', in which a flat filter element 4 (FIG. 4) is mounted by insert molding. The lid plate 3b is engaged with an inner shoulder surface 6 of the frame 3a provided near the inclined open top thereof and is secured thereto by ultrasonic welding.

The pump holder 1 is coupled to the filter housing 3 such that the suction pipe 2 penetrates the lid plate 3b. The lid plate 3b has an opening for passage of the suction pipe 2 provided at a portion thereof apart from the filter windows 3'. The lid plate 3b has a downwardly projecting, elastic tapered cylindrical portion 7 surrounding the opening in order to prevent detachment of the inserted suction pipe and also to ensure a good seal between the suction pipe and the opening. The outer periphery of the suction pipe 2 is provided with projections 8 and an elastic flange 9. The projections 8 extend as distinct segments in the circumferential direction in the illustrated embodiment but a single continuous projection 8 can also be used. As the suction pipe is inserted through the opening, the projections 8 pass through the cylindrical portion 7 by forcibly expanding the same. When the projections clear the cylindrical portion, they are hooked on the lower end of the cylindrical portion. The elastic flange 9 is provided slightly above the projections. Its edge is urged against the top of the lid plate 3b surrounding the opening when the projections 8 are hooked on the lower end of the cylindrical portion 7.

The inner diameter of the lower end of the cylindrical portion 7 is the same as or slightly smaller than the outer diameter of the suction pipe 2.

The suction pipe 2 is inserted through the cylindrical portion 7 in a direction at right angles to the lid plate 3b. The lid plate 3b is secured to the inclined open top of the frame 3a. When the filter device is mounted, the suction pipe 2 is inclined with respect to the bottom of the tank 5. Thus, the lower open end 2' of the suction pipe 2 is made inclined with respect to the axis of the suction pipe so as to be substantially parallel to the bottom of the tank. The suction pipe and filter housing are positioned in this state. Their relative rotation is prevented by locking means 10 which consists of a protuberance 10a and a recess 10b. The protuberance and recess are provided in the filter housing 3 and the suction pipe 2, respectively, and engage with each other. In this embodiment, the protuberance 10a and recess 10b of the locking means 10 are provided in the inner wall of the filter housing and the lower end of the suction pipe, respectively. Alternatively, it is possible to provide the lid plate 3b of the filter housing with a recess and the suction pipe with a projection.

To assemble the filter device, the suction pipe 2 of the pump holder 1 is inserted through the tapered cylindrical portion 7 of the lid plate of the filter housing until its lower open end reaches the neighborhood of the horizontal bottom wall of the tank 5. In this state, the projections 8 are hooked on the lower end of the cylindrical portion 7. Thus, the detachment of the suction pipe 2 is prevented. In addition, the cylindrical portion 7 is held in close contact with the suction pipe 2, while the elastic flange 9 of the suction pipe is urged against the top of the lid plate to provide a seal. After the filter housing has been assembled in this way, the pump holder 1 is coupled to a lower end portion of a pump P having an inlet. The pump P thus is then disposed in the tank 5 so as to be inclined by a predetermined angle with respect to the bottom 5' of the tank 5. The pump holder is then turned with respect to the pump to make the horizontal bottom wall of the filter housing and the lower open end 2' of the suction pipe substantially parallel to the bottom of the tank. The horizontal bottom wall of the filter housing is preferably provided in the vicinity of the tank bottom.

The pump P thus can draw fuel through the filter housing 3 and into the suction pipe 2 and pump the so filtered fuel to the outside of the tank. Since the lower open end 2' of the suction pipe is substantially parallel to the bottom 5' of the tank, the pump can draw in only fuel without taking in any air up to such time that the fuel level falls to just above the lower open end 2' of the suction pipe, even though the suction pipe is inclined with respect to the tank bottom.

Further since the pump holder is coupled to the filter housing through the suction pipe, the size and weight of the filter housing can be greatly reduced.

Where the filter housing has a flat surface as in this embodiment, it may be formed with the filter window 3' closed by the filter element 4 without use of any tool for supporting the filter element in a mold for insert molding. Thus, the molding can be facilitated compared to the prior art structure where a filter window is formed in a cylindrical wall. The productivity thus can also be improved.

Further, while the illustrated embodiment is used with a pump which is inclined with respect to the bottom of a tank, the invention is also applicable to a pump which is disposed perpendicular to the bottom of a tank. In this case, the suction pipe has a lower open end 2' which is perpendicular to the axis of the pipe.

Further, in the above embodiment the suction pipe 2 is made integral with the pump holder. However, the two components may be constituted as a single member. Further, it is possible to make the suction pipe integral with the filter housing and couple the pump holder and suction pipe in a suitably sealed relation to each other.

In FIG. 1, reference numeral 11 designates an air purging port, through which air in the filter housing 3 is purged. It is formed integral with the lid plate 3b of the filter housing. A tube 12 is connected to the port 11, and the other end of the tube is positioned in the upper space of the fuel tank.

As has been described in the foregoing, according to the invention a pump holder, in which a pump is mounted, and a filter housing having a filter element for filtering fuel, are formed separately. The filter housing thus can be small in size and low in weight, while having the required area. Further, the lower open end of the suction pipe which is coupled to the filter housing under the pump holder extends substantially parallel to the tank bottom. Thus, even in a case where the pump is installed in an inclined relation to the bottom of the tank, the pump can pump fuel to the outside of the tank without taking in air until the level of the fuel falls to just above the lower open end of the suction tube.

What is claimed is:

1. In combination with a fuel tank having a substantially horizontal bottom wall, a filter device for an in-tank type fuel pump, comprising:

a pump holder having a lower end and an open upper end and adapted to receive and retain an in-tank type fuel pump at said upper end and having a longitudinal axis forming an acute angle with said fuel tank bottom wall;

a filter housing connected to the lower end of said pump holder, said filter housing being substantially triangular in vertical section and having a bottom wall close to and substantially parallel to said fuel tank bottom wall and further having a top wall substantially perpendicular to said axis and a remote end wall connecting said filter housing top wall and said filter housing bottom wall, each of said filter housing walls having a window therein respectively closed by a filter element; and a suction pipe provided between the bottom end of said pump holder and said filter housing, said suction pipe being parallel to said axis and extending into said filter housing through said top wall thereof, said suction pipe having a lower open intake end within said filter housing and adjacent said filter housing bottom wall, said lower open intake end being substantially planar and being substantially parallel to said filter housing bottom wall and oblique to said axis.

2. A filter device according to claim 1, wherein said pump holder and suction pipe are integral with each other.

3. A filter device according to claim 1, wherein said pump holder and suction pipe are separate members, and said suction pipe is integral with the top of said filter housing.

* * * * *